United States Patent [19]
Atkinson

[11] 3,891,285
[45] June 24, 1975

[54] ELECTROSTATIC BEARING SENSING AND CONTROL CIRCUITRY

[75] Inventor: James L. Atkinson, La Mirada, Calif.

[73] Assignee: Rockwell International Corporation, El Segundo, Calif.

[22] Filed: May 13, 1974

[21] Appl. No.: 469,165

[52] U.S. Cl............. 308/10; 74/5.6 D; 74/5.6 E; 73/517 B
[51] Int. Cl.²....................................... F16C 39/00
[58] Field of Search......... 308/10; 74/5.6 D, 5.6 E; 73/504, 517 B, 517

[56] References Cited
UNITED STATES PATENTS

| | | | |
|---|---|---|---|
| 3,098,679 | 7/1963 | De Boice | 308/10 |
| 3,262,325 | 7/1966 | Senstad | 308/10 |
| 3,262,326 | 7/1966 | Schott | 308/10 |
| 3,334,949 | 8/1974 | Atkinson | 308/10 |
| 3,338,644 | 8/1967 | Atkinson | 308/10 |
| 3,482,455 | 12/1969 | Boltinghouse | 74/5.6 D |
| 3,619,014 | 11/1971 | Quick | 308/10 |
| 3,642,334 | 2/1972 | Atkinson | 308/10 |
| 3,742,767 | 7/1973 | Bernard | 308/10 |

*Primary Examiner*—R. Skudy
*Attorney, Agent, or Firm*—L. Lee Humphries; H. Fredrick Hamann; Rolf M. Pitts

[57] ABSTRACT

In an electrostatic-suspension, force-rebalance type inertial instrument in which the suspension plates of the electrostatic bearing are further used in a capacitive bridge to provide inertial data read-out, improved means for decoupling the force-rebalance signal component and the inertial data signal component in the read-out signal.

5 Claims, 2 Drawing Figures

ELECTROSTATIC BEARING SENSING AND CONTROL CIRCUITRY

The invention herein described was made in the course of or under a contract or subcontract thereunder, with the United States Navy.

BACKGROUND OF THE INVENTION

This invention relates to circuitry for electrostatic bearing type inertial instruments such as gyroscopes.

As has been more fully explained in my U.S. Pat. No. 3,334,949 for Electrostatic Bearing, a rotatable member may be supported between two electrodes by the application of an A-C potential between such member and electrodes. When the suspension electrodes or plates of the electrostatic bearing are also used in a capacitive bridge arrangement to also provide load-mass position information, a universal problem arises due to the electrical mixing of the force and position signals at the pick-off signal output. In other words, decoupling of the force signal component and position signal component of the pick-off output signal is required.

One solution to such signal decoupling requirement is disclosed in the above-cited U.S. Pat. No. 3,334,949 and employs a model transformer interposed in series circuit between the support signal generator and the inductively-coupled electrostatic bearing. The model transformer is selected or matched with the inductive coupling transformer and capacitively loaded so as to provide an impedance analog of the electrostatic bearing load impedance. Thus, the voltage developed across the model transformer or impedance analog in response to the support-control current therethrough corresponds to that force voltage component in the voltage drop across the inductive coupling of the electrostatic bearing due to such support-control current. Appropriate opposite poling of the model transformer then tends to result in cancellation of the force voltage component in the output signal of the bearing sensing circuit. Accordingly, the resultant signal is indicative of the rotor position relative to the electrodes or electrostatic plates and corresponding to an inertial data read-out of interest.

A disadvantage of the solution described in my above-noted U.S. Pat. No. 3,334,949 is the requirement of a model transformer and the necessity of matching it to the load impedance as seen by the inductive, or transformer, coupling for the bearing. Such necessity to match impedances either limits the accuracies obtainable in practice or else increases the unit costs of production due to the discarding of mismatches, such limited accuracies being noted at lines 50–53 of column 6 of the above-cited U.S. Pat. No. 3,334,949. Also, such reliance upon a technique of impedance matching imposes serious logistic constraints on maintenance and repairs of such devices. Further, the necessity of a second or model transformer represents a substantial portion of the overall volume of a single axis electrostatic bearing element which volumetric penalty is multiplied by the number of control channels or axes of a complete bearing system. Moreover, such series connected model transformer serves to increase the required power rating of the control current generator employed to provide the bearing force-rebalance signal.

SUMMARY OF THE INVENTION

By means of the concept of my improved invention, the above-noted limitations of my earlier patent are avoided, and a more efficient structure is achieved.

In a preferred embodiment of my invention, the prior-art model transformer is no longer utilized. Instead, a compensatorily gain-scaled control voltage is differentially combined with that voltage drop occurring across the load impedance inductive coupling, thereby cancelling the force signal component in such A-C voltage drop. Also, such force rebalance signal component is maintained in substantially a co-phasal time-phase relation with the position signal component by phase coding means to assure adequate control or biasing of such position signal of interest by the force-rebalance or control signal.

Accordingly, it is an object of the invention to provide improved electronic sensing and control circuitry for an electrostatic bearing and which avoids the disadvantages associated with the above-noted model transformer technique.

It is another object to provide electronic sensing and control circuitry for an electrostatic bearing and which is of minimum size and power rating.

A further object is to provide electrostatic bearing sensing and control means of improved accuracy.

These and further objects of the invention will become apparent from the following description, with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
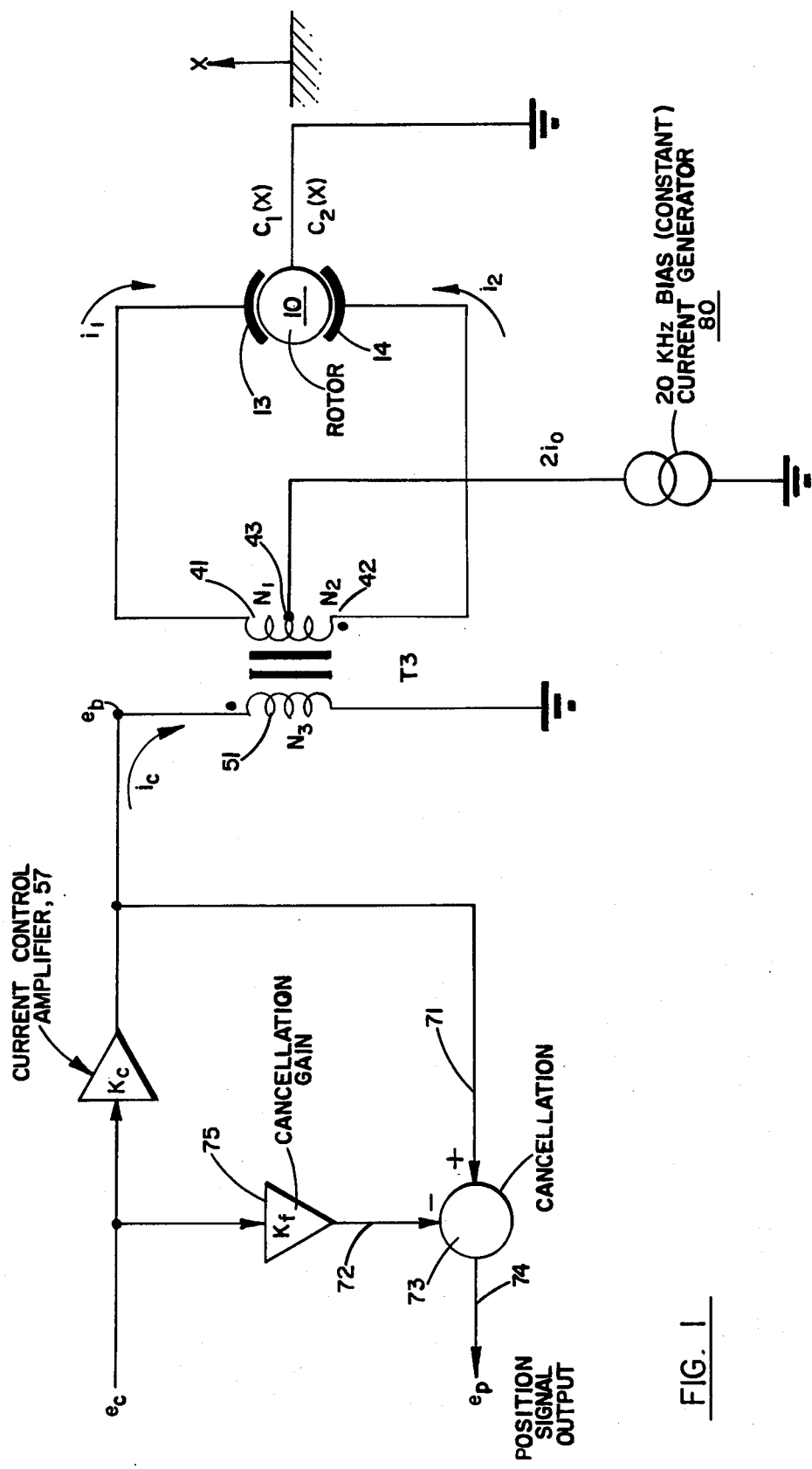
FIG. 1 is a schematic diagram of a sensing and control circuit for one axis of an electrostatic bearing type device and embodying the concept of the invention.

Referring now to FIG. 1, there is illustrated a schematic arrangement of a sensing and control circuit for one axis of an electrostatic bearing type device and embodying the concept of the invention. There is provided an exemplary single axis electrostatic bearing comprising plates or electrodes 13 and 14 for support of a rotatable metal sphere 10 of, say, a representative electrostatic bearing type gyroscope, and center-tapped inductive coupling means T-3 for coupling the electrostatic load impedance provided by cooperation of elements 10, 13 and 14 to sensing and control circuitry, as is more fully described in my U.S. Pat. No. 3,334,949. In other words, inductive means T-3 comprises a transformer having a center tapped secondary, the end terminals 41, 42 of which are connected across the series-connected capacitances $C_1(x)$ and $C_2(x)$ represented by elements 13 and 14, a 20 kHz constant current generator or excitation source being connected across rotor 10 and secondary center tap terminal 43 to complete a bridge circuit arrangement, rotor 10 being shown grounded for convenience in exposition of the exemplary single axis configuration of FIG. 1.

There is also provided a linear current generator or current control amplifier 57 for providing an alternating control current $i_c$ in response to an applied control voltage $e_c$. Such response is substantially linear or proportional to the applied A-C control voltage and is also maintained in time phase quadrature relative thereto by phase-shifting, or reactive impedance, means included in amplifier 57 as is well understood in the art. Because the structural arrangement of such amplifier is well known in the art, such element is shown in block form only for convenience in exposition.

The output of amplifier 57 is fed to both the primary winding 51 of transformer T3 and an 71 input of electronic signal differencing means 73, a second input 72 thereof being connected to a preselectively gain-scaled version $K_f e_c$ of the control voltage $e_c$.

In normal operation of the above-described arrangement, a control current $i_c$ is provided in time-phase quadrature response to control voltage $e_c$ for electrostatic support of rotor 10 between electrodes 13 and 14 in opposition to gravitational effects upon rotor 10. A back-e.m.f. component due to the load across the primary winding 51 of transformer T3 reflects the voltage drop or effect of the inductively coupled control current $i_c$ through the series capacitances formed by elements 10, 13 and 14. A second voltage component $e_d(x)$ appears across primary winding 51 caused by any unbalance occurring in the above-noted capacitive bridge circuit due to the assymmetrical position or displacement ($x$) of rotor 10, relative to electrodes 13 and 14.

Where design tolerances can be maintained in manufacture so as to assure performance predictability of constant current generator 57 and transformer T3, for example, then such voltage component (in response to $$e_b = \frac{N_3}{2N_1}\left(\frac{1}{j\omega_c C_0}\right)\left[-i_1\left(1-\frac{x}{g_0}\right) + i_2\left(1+\frac{x}{g_0}\right)\right] \quad (7)$$

control current $i_c$) may be predicted by means of the suitable scaling ($K_f$ volts/volt) of $e_c$, and such predicted voltage ($K_f e_c$) employed by electronic differential signalling means 73 to cancel such voltage component. Thus, the output $e_p$ of signalling means 73 is substantially indicative of only that voltage component $e_d(x)$ (of the voltage drop $e_b$ across primary winding 51) or unbalance voltage which is indicative of the relative displacement ($x$) of rotor 10 from a symmetrical or central position. In other words, element 73 serves as force signal cancellation means in the control and sensing circuitry, to provide a sensed position signal output, $e_p$. Such gain-scaling may be accomplished by a feedback controlled amplifier 74 or other precision signal-attenuation means.

A more analytical explanation of such internal signal cancellation operations may be presented, as follows: consider the capacitances of the rotor-cavity electrode gap to be designated as $C_1(x)$ and $C_2(x)$ for element pairs 10, 13 and 10, 14, respectively; and designate the constant carrier current from bias generator 80 as $2i_0$. In other words, capacitances $C_1$ and $C_2$ are functions of the rotor displacement $x$; and the displacement or position pickoff signal $e_p$ may also be determined to be a function of displacement $x$, employing the following relationships:

$$\frac{1}{C_1(x)} = \frac{1}{C_0}\left(1-\frac{x}{g_0}\right) \quad (1)$$

$$\frac{1}{C_2(x)} = \frac{1}{C_0}\left(1+\frac{x}{g_0}\right) \quad (2)$$

$$i_c = jK_c e_c \quad (3)$$

$$e_c = E_c \cos \omega_c t \quad (4)$$

$$i_0 = I_0 \cos \omega_c t \quad (5)$$

where
$C_0$ is nominal gap capacitance
$g_0$ is nominal gap
$x$ is rotor displacement from cavity center
$jK_c = K_c e^{j90°}$ is the steady-state transfer relation between $e_c$ and $i_c$
$E_c$ is peak value of control voltage
$\omega_c$ is carrier frequency
$I_0$ is peak value of bias current The transformer primary voltage drop $e_b$ may be expressed in terms of the secondary currents, impedances and turns ratio $$\left(\frac{N_3}{N_1+N_2} \text{ or } \frac{N_3}{2N_1}\right) : \text{ (where } N_1 = N_2\text{)}$$

$$e_b = \frac{N_3}{2N_1}\left(\frac{i_1}{j\omega_c C_1(x)} + \frac{i_2}{j\omega_c C_2(x)}\right) \quad (6)$$

Substituting Equation (1) and (2) for $C_1(x)$ and $C_2(x)$ respectively in Equation (6) and combining terms:

Now the respective transformer currents may be expressed in terms of the bias current $2i_0$, control current $i_c$ and the turns-ratio, as:

$$i_1 = i_0 - \frac{N_3}{2N_1}i_c \quad (8)$$

$$i_2 = i_0 + \frac{N_3}{2N_1}i_c \quad (9)$$

Substituting Equations (8) and (9) for $i_1$ and $i_2$ respectively in Equation (7):

$$e_b = \frac{N_3}{2N_1}\left(\frac{1}{j\omega_c C_0}\right)\left[\left(-i_0 - \frac{N_3}{2N_1}i_c\right)\left(1-\frac{x}{g_0}\right) + \left(i_0 + \frac{N_3}{2N_1}i_c\right)\left(1+\frac{x}{g_0}\right)\right] \quad (10)$$

Combining terms:

$$e_b = \frac{1}{j\omega_c C_0}\left[\left(\frac{N_3}{2N_1}\right)\right]\left(\frac{2i_0 x}{g_0} + \frac{2N_3}{2N_1}i_c\right) \quad (11)$$

Rearranging $$e_b = 2\left(\frac{N_3}{2N_1}\right)\frac{2i_c}{j\omega C_0} + 2\left(\frac{N_3}{2N_1}\right)\frac{i_0 x}{j\omega C_0 g_0} \quad (12)$$

$$e_b = \frac{i_c}{j\omega_c \frac{C_0}{2}\left(\frac{2N_1}{N_3}\right)^2} + \frac{\left(\frac{2N_1}{N_3}\right)\frac{x}{g_0}i_0}{j\omega_c \frac{C_0}{2}\left(\frac{2N_1}{N_3}\right)^2} \quad (12a)$$

$$e_b = \frac{i_c + \frac{x}{g_0}i_0\left(\frac{2N_1}{N_3}\right)}{j\omega_c \frac{C_0}{2}\left(\frac{N_3}{2N_1}\right)^2} \quad (13)$$

Defining the reflected gyro capacity, $C_r$ as:

$$C_r = \frac{C_o}{2}\left(\frac{2N_1}{N_3}\right)^2 \quad (14)$$

and the displacement voltage component $e_d(x)$ as:

$$e_d(x) = \frac{x}{g_o} \frac{i_o\left(\frac{2N_1}{N_3}\right)}{j\omega_c C_r} \quad (15)$$

And substituting such terms in Equation (13);
Then, $$e_b = \frac{i_c}{j\omega_c C_r} + e_d(x) \quad (16)$$

but $$i_c = jK_c e_c \quad (17)$$

Therefore, $e_b = \frac{K_c}{\omega_c C_r} e_c + e_d(x) \quad (18)$

Representing $e_p$ in the form:

$$e_p = e_b - K_F e_c \quad (19)$$

and substituting Equation (18) for $e_b$:

$$e_p = \frac{K_c}{\omega_c C_r} e_c + e_d(x) - K_F e_c \quad (20)$$

For internal cancellation in Equation (10), let $$K_F e_c = \frac{K_c}{\omega_c C_r} e_c \quad (21)$$

Therefore:

$$K_f = \frac{K_c}{\omega_c C_r} \quad (22a)$$

and $e_p = e_d(x)$, the desired position pickoff signal.

(22b)

In the arrangement of FIG. 1, current control generator 57 is a standard-design, high-gain amplifier having an output current feedback from a series circuit reactive element. The purpose of such inclusion of a reactive element for phase shift of the control current, is to assure that the resultant control voltage drop ($K_c/\omega_c C_r \cdot e_c$ across the bridge impedance formed by $C_1(x)$ and $C_2(x)$ is substantially in-phase with the position voltage drop $e_d(x)$ produced by 20kHz constant current generator 57 for maximum control effectiveness thereover.

The force-rebalance servo loop in which the single axis arrangement of FIG. 1 is employed, is closed by feeding the pickoff voltage or output of difference signalling means 73 into a standard rate-proportional-integral type compensation network $$\left(H_{(s)} = K_1 s + K_2 + \frac{K_3}{s}\right)$$

and having a speed control notch at the rotor frequency and whose output is that control voltage, $e_c$, employed by current generator 57. Such integral action assures a necessary bias level without the necessity of a large steady state error in the $e_p$ signal, the proportional control assures rapid or good dynamic response to transient condition of $e_p$, and the rate control provides loop stabilization or restores the loop phase-margin, all of which is well understood in the art of servo design. Accordingly, such network is shown in block form only as element 56 in the four axis embodiment of FIG. 2.

Figure 2:
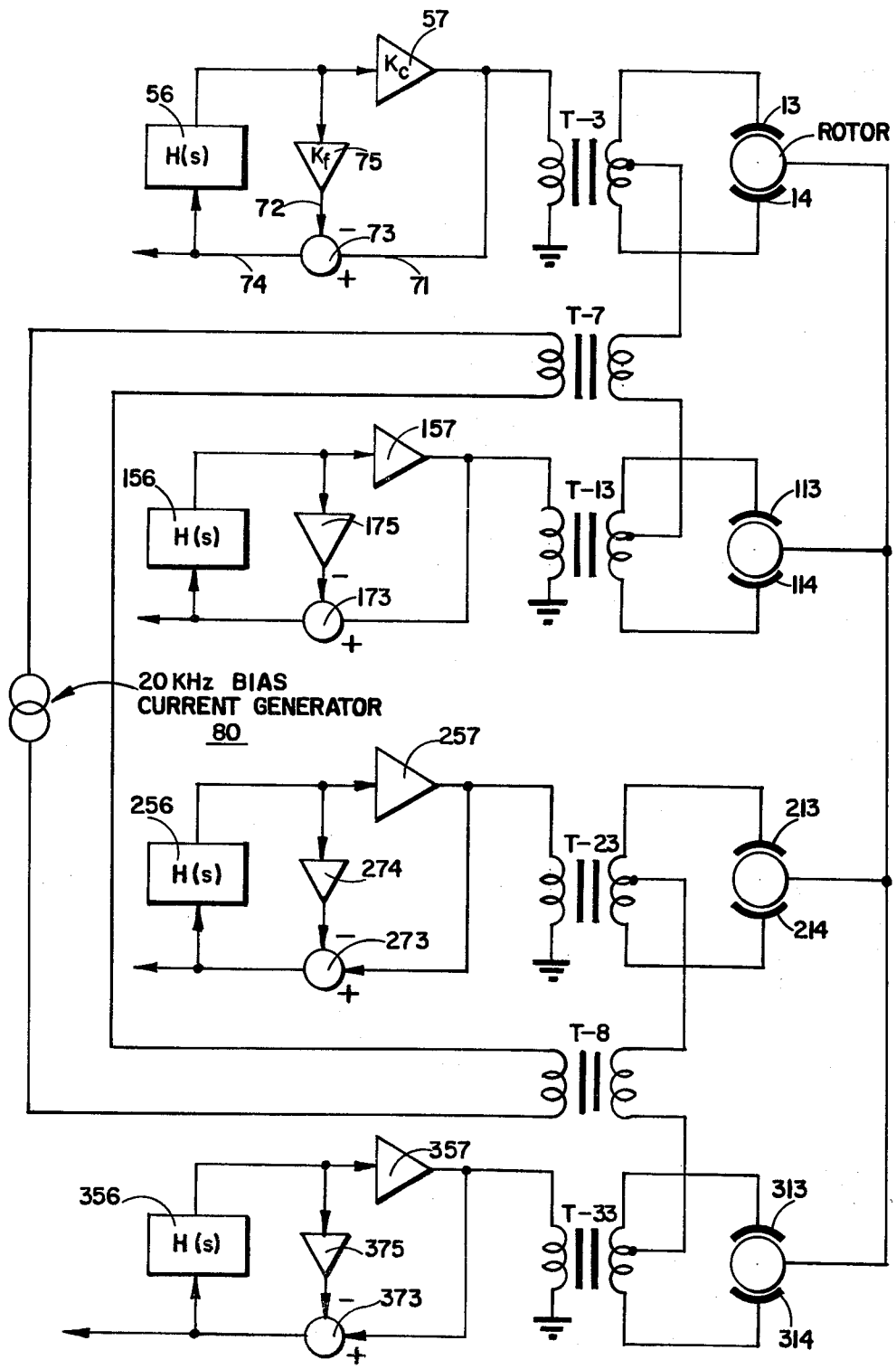
FIG. 2 is a schematic diagram of a typical four axis electrostatic bearing suspension system for an exemplary gyro and advantageously embodying the inventive concept.

Referring to FIG. 2, there is provided a representative four-axis embodiment of an exemplary gyro system in which the concept of FIG. 1 may be advantageously employed. Each axis of FIG. 2 is similarly constructed and arranged. In such multi-axis system illustrated in FIG. 2, the elements common to those elements described in connection with the single axis of FIG. 1 are similarly labelled with like reference characters for the first axis, and such reference characters employed in successive axes with a successive hundred's digit. For example, the current generator in the first axis is indicated by reference character 57, corresponding to the like element in FIG. 1, the like element in the second axis of FIG. 2 being identified by reference character 157, that in the third axis indicated as element 257, and that in the fourth axis as element 357. Excitation source or constant current generator 80 is shown as being coupled to a first set of axes by a coupling transformer T-7 and coupled to a set of the remaining two axis by a second coupling transformer T-8.

Obviously, the illustrated arrangement is readily adaptable to a three-axis system, such as that shown in the above-cited U.S. Pat. No. 3,334,949, and in which A-C bias source 80 may, for example, be a three-phase generator rather than the single-phase device illustrated herein.

Accordingly, it is to be appreciated that there has been described sensing and control means for an electrostatic bearing which employs control-signal component cancellation means, such cancellation means being electronic difference signalling means responsive to a preselected attenuation of the control voltage source for predicting or generating a replica of the signal component-to-be-cancelled. In other words, a series-connected, oppositely-poled model transformer is not employed to generate such analog or replica. Therefore, system inaccuracies due to imperfect matches between such model transformer and the bearing impedance are avoided. Also, the elimination of such model impedance controlled by the control current generator allows a reduction in the required power rating of the control current generator. Further, the elimination of such second transformer in each axis of a multi-axis system allows a substantial reduction in the volume of such system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an electrostatic suspension, force-rebalance type inertial instrument in which the s⋯⋯ ⋯ ⋯ of the electrostatic bearing are further used in a capacitive bridge to provide inertial data read-out, non-magnetic circuit means for decoupling the force rebalance signal component and the inertial data signal components.

2. The device of claim 1 in which said non-magnetic circuit means comprises electronic difference signalling means having a first input responsively coupled to said capacitive bridge and further a second input responsively coupled to an A-C force rebalance voltage source of said instrument compensatory gain scaling means interposed between said force rebalance voltage source and said second input of said difference signalling means, for simulating that force rebalance signal component occurring in the first input to said difference signalling means, whereby said component is cancelled in the output of said signal differencing means.

3. In an electrostatic bearing support circuit for supporting a rotatable member between a pair of electrodes and having electrostatic support means for establishing an A-C potential between said rotatable member and said electrodes for electrostatically supporting said rotatable member, sensing means for providing an A-C position signal which varies as a function of the position of said rotatable member with respect to said electrodes, inductance means inductively coupling said sensing means to said support means, the improvement of support signal cancellation means comprising electronic differential signalling means having a first input responsively connected across said inductance means and a second input coupled to a support voltage source of said supporting means; and signal attenuation means for preselectively attenuating the input voltage applied to said second input of said signalling means to provide a replica of the support voltage component drop across said inductance means.

4. In an electrostatic suspension, force-rebalance type inertial instrument in which the suspension plates of the electrostatic bearing are further used in a capacitive bridge to provide position pickoff data read-out, non-magnetic circuit means for decoupling the force rebalance signal component and the pickoff position data signal components; said non-magnetic circuit means comprising electronic difference signalling means having a first input responsively coupled to said capacitive bridge and further a second input responsively coupled to an A-C force rebalance voltage source of said instrument, compensatory gain scaling means interposed between said force rebalance voltage source and said second input of said difference signalling means, for simulating that force rebalance signal component occurring in the first input to said difference signalling means, whereby said component is cancelled in the output of said signal differencing means;

said instrument further including generating means responsive to said force rebalance voltage for generating a force rebalance alternating current substantially in time-phase quadrature with said force rebalance voltage, said current being fed to said capacity bridge by an inductive sensing and control circuit, said compensatory gain-scaling means comprising electronic feedback amplifying means.

5. In an electrostatic bearing support circuit for supporting a rotatable member between a pair of electrodes and having electrostatic support means for establishing an A-C potential between said rotatable member and said electrodes for electrostatically supporting said rotatable member, sensing means for providing an A-C position signal which varies as a function of the position of said rotatable member with respect to said electrodes, inductance means inductively coupling said sensing means to said support means, the improvement of support signal cancellation means comprising electronic differential signalling means having a first input responsively connected across said inductance means and a second input coupled to a support voltage source of said supporting means; and signal attenuation means for preselectively attenuating the input voltage applied to said second input of said signalling means to provide a replica of the support voltage component drop across said inductance means;

said support means including phase coding means for providing a co-phasal time-phase relation between the support voltage component drop across said inductance means and the position voltage drop thereacross.

* * * * *